United States Patent
Sekiguchi

(10) Patent No.: US 7,742,864 B2
(45) Date of Patent: *Jun. 22, 2010

(54) VEHICLE SURROUNDINGS MONITORING APPARATUS AND TRAVELING CONTROL SYSTEM INCORPORATING THE APPARATUS

(75) Inventor: Hiroyuki Sekiguchi, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 322 days.

This patent is subject to a terminal disclaimer.

(21) Appl. No.: 10/651,489

(22) Filed: Aug. 29, 2003

(65) Prior Publication Data

US 2004/0098196 A1    May 20, 2004

(30) Foreign Application Priority Data

Sep. 4, 2002    (JP) ............... 2002-259173

(51) Int. Cl.
*G01S 13/93* (2006.01)

(52) U.S. Cl. .................. 701/96; 701/301; 180/169; 340/435; 342/70

(58) Field of Classification Search .............. 701/36, 701/1, 39, 96, 29, 213, 117, 93, 30, 301; 340/438, 435, 436, 903; 180/168, 169; 213/36; 382/104; 342/70, 54

See application file for complete search history.

(56) References Cited

U.S. PATENT DOCUMENTS

| | | | | |
|---|---|---|---|---|
| 5,471,214 A * | 11/1995 | Faibish et al. | ............ | 342/70 |
| 5,926,126 A | 7/1999 | Engelman | | |
| 5,983,161 A * | 11/1999 | Lemelson et al. | ......... | 701/301 |
| 6,032,097 A * | 2/2000 | Iihoshi et al. | ............ | 701/96 |
| 6,370,475 B1 * | 4/2002 | Breed et al. | ............ | 701/301 |
| 6,418,370 B1 * | 7/2002 | Isogai et al. | ............ | 701/96 |
| 6,445,809 B1 * | 9/2002 | Sasaki et al. | ............ | 382/104 |
| 6,484,087 B2 * | 11/2002 | Shirai et al. | ............ | 701/96 |
| 6,492,935 B1 * | 12/2002 | Higuchi | ............ | 342/70 |
| 6,580,385 B1 * | 6/2003 | Winner et al. | ............ | 342/70 |
| 6,615,137 B2 * | 9/2003 | Lutter et al. | ............ | 701/301 |
| 6,784,828 B2 * | 8/2004 | Delcheccolo et al. | ......... | 342/70 |
| 6,944,543 B2 * | 9/2005 | Prakah-Asante et al. | .... | 701/301 |
| 7,009,500 B2 * | 3/2006 | Rao et al. | ............ | 340/435 |
| 7,079,017 B2 * | 7/2006 | Lang et al. | ............ | 340/435 |

(Continued)

FOREIGN PATENT DOCUMENTS

EP    0 890 470 A2    1/1999

(Continued)

*Primary Examiner*—Khoi H. Tran
*Assistant Examiner*—Ronnie Mancho
(74) *Attorney, Agent, or Firm*—Darby & Darby, P.C.

(57) ABSTRACT

A vehicle surroundings monitoring apparatus inputs signals indicative of images from a stereoscopic camera, a vehicle speed, a steering wheel angle and a yaw rate and estimates a traveling path of an own vehicle according to vehicle forward information and traveling conditions of the own vehicle. The apparatus establishes a traveling region A according to this traveling path and further establishes a traveling region B based on at least either of the traveling region A and road information. It is judged whether a detected solid object is a preceding vehicle or a tentative preceding vehicle according to the state of existence of the object in the traveling regions A, B and the preceding vehicle is outputted to a traveling control unit.

4 Claims, 11 Drawing Sheets

U.S. PATENT DOCUMENTS 7,113,098 B1 * 9/2006 Hayes .................... 340/573.2
2003/0191568 A1 * 10/2003 Breed ......................... 701/36

FOREIGN PATENT DOCUMENTS

| | | |
|---|---|---|
| EP | 1 065 520 A2 | 1/2001 |
| JP | 10-105864 | 4/1998 |
| JP | 10-283593 | 10/1998 |
| JP | 2000-1379001 A1 | 5/2000 |
| JP | 2001-043496 | 2/2001 |

\* cited by examiner

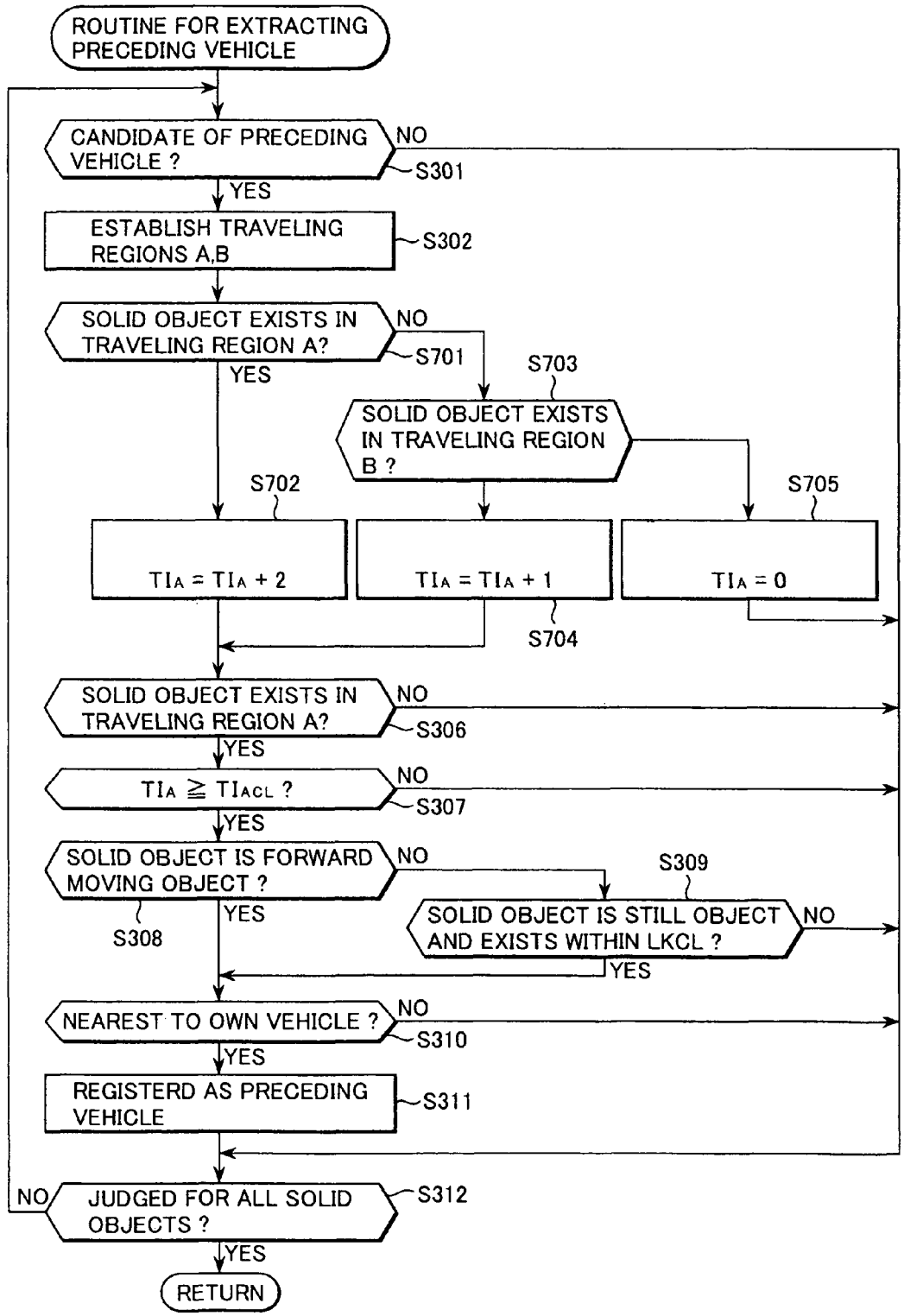

VEHICLE SURROUNDINGS MONITORING APPARATUS AND TRAVELING CONTROL SYSTEM INCORPORATING THE APPARATUS

The disclosure of Japanese Patent Application No. 2002-259173 filed on Sep. 4, 2002 including the specification, drawings and abstract is incorporated herein by reference in its entirety.

BACKGROUND OF THE INVENTION

1. Field of the Invention

The present invention relates to a vehicle surroundings monitoring apparatus for detecting a preceding vehicle existing ahead of an own vehicle from traveling circumstances in front of the own vehicle detected by a stereoscopic camera, a monocular camera, a millimeter wave radar, and the like and to a traveling control system incorporating such vehicle surroundings monitoring apparatus.

2. Discussion of Related Arts

In recent years, such a traveling control system as detecting traveling circumstances by a camera and the like mounted on a vehicle, recognizing a preceding vehicle from the traveling circumstances data and making a control to follow up the preceding vehicle or to keep an intervehicle distance between the own vehicle and the preceding vehicle, has been put into practical use.

For example, Japanese Patent Application Laid-open No. Toku-Kai 2000-137900 discloses a technology in which a preceding vehicle is judged from the relationship between a present lateral position and an estimated lateral position of a solid object at an own lane region and the intervehicle distance control or the issuance of warning are performed in a manner similar to drivers' driving senses.

However, the disadvantage of the prior art is that since the judgment of a preceding vehicle is dependent upon the estimated lateral position of a solid object at the own lane region, if the estimation differs, the detection of the preceding vehicle may fail. Further, according to the prior art, since the intervehicle distance control or the issuance of warning is made based on the judgment whether the detected object is a preceding vehicle or not, for instance, in case where a vehicle comes in and out the own lane, a smooth detection of the preceding vehicle is hindered.

SUMMARY OF THE INVENTION

It is an object of the present invention to provide a vehicle surroundings monitoring apparatus capable of smoothly, securely and quickly detecting a preceding vehicle from among solid objects ahead and capable of making a traveling control taking the preceding vehicle into consideration in a natural manner similar to drivers' senses and to provide a traveling control system having this vehicle surroundings monitoring apparatus.

In order to attain the object, a vehicle surroundings monitoring apparatus comprises own vehicle traveling conditions detecting means for detecting traveling conditions of an own vehicle, vehicle forward information detecting means for detecting a vehicle forward information including a solid object and a road information ahead of the own vehicle, own vehicle traveling path estimating means for estimating a traveling path of the own vehicle according to the vehicle forward information and the traveling conditions, first judgment region establishing means for establishing a first judgment region corresponding to the solid object detected based said traveling path of the own vehicle, second judgment region establishing means for establishing a second judgment region corresponding to the solid object detected based on the first judgment region and the road information detected by the vehicle forward information detecting means, and preceding vehicle judging means for judging whether the solid object is a preceding vehicle, a tentative preceding vehicle or other objects according to the state of existence of the solid object in the first judgment region and the second judgment region.

Further, a traveling control system incorporating the vehicle surroundings monitoring apparatus performs a constant speed traveling, a follow-up traveling and the like according to a preceding vehicle information extracted by the vehicle surroundings monitoring apparatus.

BRIEF DESCRIPTION OF THE DRAWINGS

FIG. 11 is a flowchart of a routine for extracting a preceding vehicle according to a second embodiment of the present invention.

DETAILED DESCRIPTION OF THE PREFERRED EMBODIMENT

Figure 1:
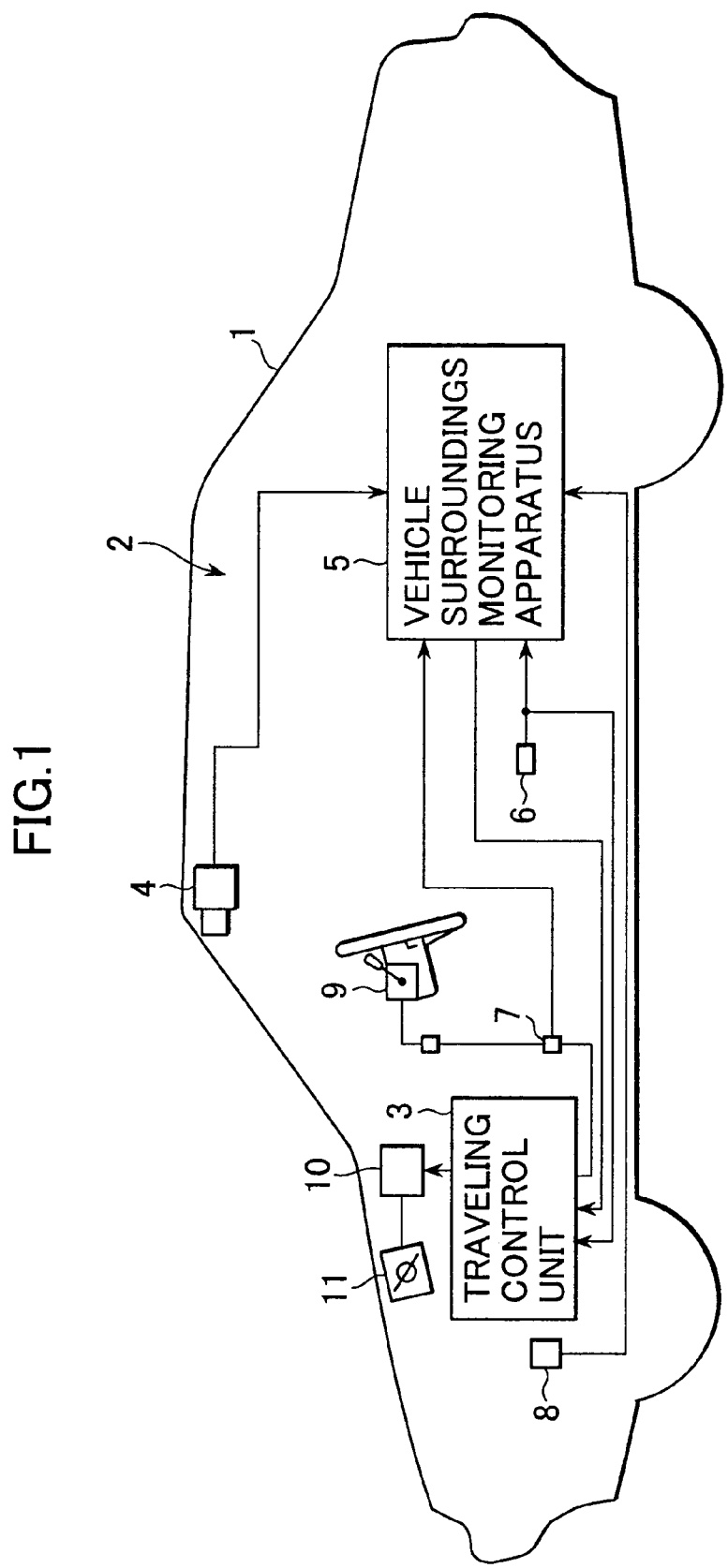
FIG. 1 is a schematic diagram showing a traveling control system having a vehicle surroundings monitoring apparatus according to a first embodiment of the present invention.

Referring now to FIG. 1, reference numeral 1 denotes a vehicle (own vehicle)on which an intervehicle distance automatically maintaining system or a so-called Adaptive Cruise Control System 2 is mounted. The Adaptive Cruise Control System 2 is constituted by a traveling control unit 3, a stereoscopic camera 4 and a vehicle surroundings monitoring apparatus 5. When the system is established to a constant speed traveling mode, a vehicle travels at a speed specified by a driver. When the system is established to a follow-up traveling mode, the target vehicle speed of the vehicle 1 is established at a speed of a preceding vehicle and the vehicle 1 travels while holding an intervehicle distance to the preceding vehicle constant according to positional information of solid objects ahead of the own vehicle 1.

The stereoscopic camera 4 constituting vehicle forward information detecting means is composed of a pair left and right) of CCD cameras using a solid-state image component such as Charge Coupled Device and the left and right cameras are transversely mounted on a front ceiling of a passenger compartment at a specified interval of distance, respectively. The respective cameras take picture images of an outside object from different view points and input the picture images to the vehicle surroundings monitoring apparatus 5.

Further, the vehicle 1 has a vehicle speed sensor 6 for detecting a vehicle speed and the detected vehicle speed is inputted to the traveling control unit 3 and the vehicle surroundings monitoring apparatus 5, respectively. Further, the vehicle 1 has a steering angle sensor 7 for detecting a steering angle and a yaw rate sensor 8 for detecting a yaw rate and the detected steering angle and yaw rate signals are inputted to the vehicle surroundings monitoring apparatus 5. These sensors 6, 7 and 8 act as own vehicle traveling conditions detecting means.

The vehicle surroundings monitoring apparatus 5 inputs respective signals indicative of picture images from the stereoscopic camera 4, vehicle speeds, steering angle, yaw rate and detects frontal information about solid object data, side wall data and lane marker data in front of the vehicle 1 based on the picture images inputted from the stereoscopic camera 4. Thus, the traveling path of the own vehicle 1 is estimated from the vehicle forward information and traveling conditions of the own vehicle 1. Further, a traveling region A (first judgment region) corresponding to a detected solid object is established based on the traveling path according to respective flowcharts which will be described hereinafter. Further, a traveling region B (second judgment region) corresponding to the solid object is established based on at least either of the traveling region A and information of the traveling path. Then, it is judged whether or not the object is a preceding vehicle or an associate preceding vehicle according to the state of the solid object in the respective traveling regions A, B and the preceding vehicle ahead of the own vehicle 1 is extracted. The result of the judgment is outputted to the traveling control unit 3. That is, the vehicle surroundings monitoring apparatus 5 is furnished with functions as vehicle forward information detecting means, own vehicle traveling path estimating means, first judgment region establishing means, second judgment region establishing means and preceding vehicle judging means.

Describing the processing of images from the stereoscopic camera 4 in the vehicle surroundings monitoring apparatus 5, with respect to a pair of stereoscopic images taken by the stereoscopic camera 4, distance information over the entire image is obtained from the deviation amount between corresponding positions according to the principle of trianguration and a distance image representing three-dimensional distance distribution is formed based on the distance information. Then, lane marker data, side wall data such as guardrails, curbs and side walls provided along the road and solid object data such as vehicles and the like, are extracted based on the distance image by means of the known grouping process and the like by referring to the three-dimensional road profile data, side wall data, solid object data and the like stored beforehand. Thus extracted lane marker data, side wall data and solid object data are denoted by different numbers respectively. Further, the solid object data are classified into three kinds of objects, a backward moving object moving toward the own vehicle 1, a still object in standstill and a forward moving object moving in the same direction as the own vehicle 1 based on the relationship between the relative displacement of the distance from the own vehicle and the vehicle speed of the own vehicle 1 and are outputted.

The traveling control unit 3 is equipped with a function of a constant speed traveling control for maintaining the vehicle speed at a value inputted by the vehicle operator and a function of a follow-up traveling control for following up the preceding vehicle in a condition keeping the intervehicle distance between the own vehicle 1 and the preceding vehicle constant. The traveling control unit 3 is connected with a constant speed traveling switch 9 constituted by a plurality of switches operated by a constant speed traveling selector lever provided on the side surface of a steering column, the vehicle surroundings monitoring apparatus 5, the vehicle speed sensor 6 and the like.

The constant speed traveling switch 9 is constituted by a speed setting switch for setting a target vehicle speed at the constant speed traveling mode, a coast switch for changing the target vehicle speed in a descending direction and a resume switch for changing the target vehicle speed in an ascending direction. Further, a main switch (not shown) for turning the traveling control on or off is disposed in the vicinity of the constant speed traveling selector lever.

When a driver turns the main switch on and sets a desired vehicle speed by operating the constant speed traveling selector lever, a signal indicative of the desired vehicle speed inputs from the constant speed traveling switch 9 to the traveling control unit 3 and a throttle valve 11 driven by a throttle actuator 10 makes a feed-back control so as to converge the vehicle speed detected by the vehicle speed sensor 6 to the established vehicle speed. As a result, the own vehicle 1 can travel at a constant speed automatically.

Further, when the traveling control unit 3 makes a constant traveling control, supposing a case where the vehicle surroundings monitoring apparatus 5 recognizes a preceding vehicle, which is traveling at a lower speed than the established vehicle speed, the traveling control unit 3 automatically changes over to a follow-up traveling control mode in which the own vehicle travels with an established intervehicle distance retained.

When the constant speed traveling control mode is transferred to the follow-up traveling control mode, a target value of an appropriate intervehicle distance between the own vehicle 1 and the preceding vehicle is established based on the intervehicle distance obtained from the vehicle surroundings monitoring apparatus 5, the vehicle speed of the own vehicle 1 detected by the vehicle speed sensor 6 and the vehicle speed of the preceding vehicle obtained from the intervehicle distance and the vehicle speed of the own vehicle 1. Further, the traveling control unit 3 outputs a drive signal to the throttle actuator 10 and makes a feed-back control of the opening angle of the throttle valve so that the intervehicle distance agrees with the target value and controls the own vehicle 1 in a condition following up the preceding vehicle with the intervehicle distance retained.

Next, a vehicle surroundings monitoring program of the vehicle surroundings monitoring apparatus 5 will be described by referring to a flowchart shown in FIG. 2.

In this embodiment, the coordinate system of the three-dimensional real space is transferred to a coordinate system fixed to the own vehicle. That is, the coordinate system is composed of X coordinate extending in a widthwise direction of the own vehicle, Y coordinate extending in a vertical direction of the own vehicle, Z coordinate extending in a lengthwise direction of the own vehicle and an origin of the coordinate placed on the road surface directly underneath the central point of two CCD cameras. The positive sides of X, Y and Z coordinates are established in a right direction, in an upward direction and in a forward direction, respectively.

Figure 2:
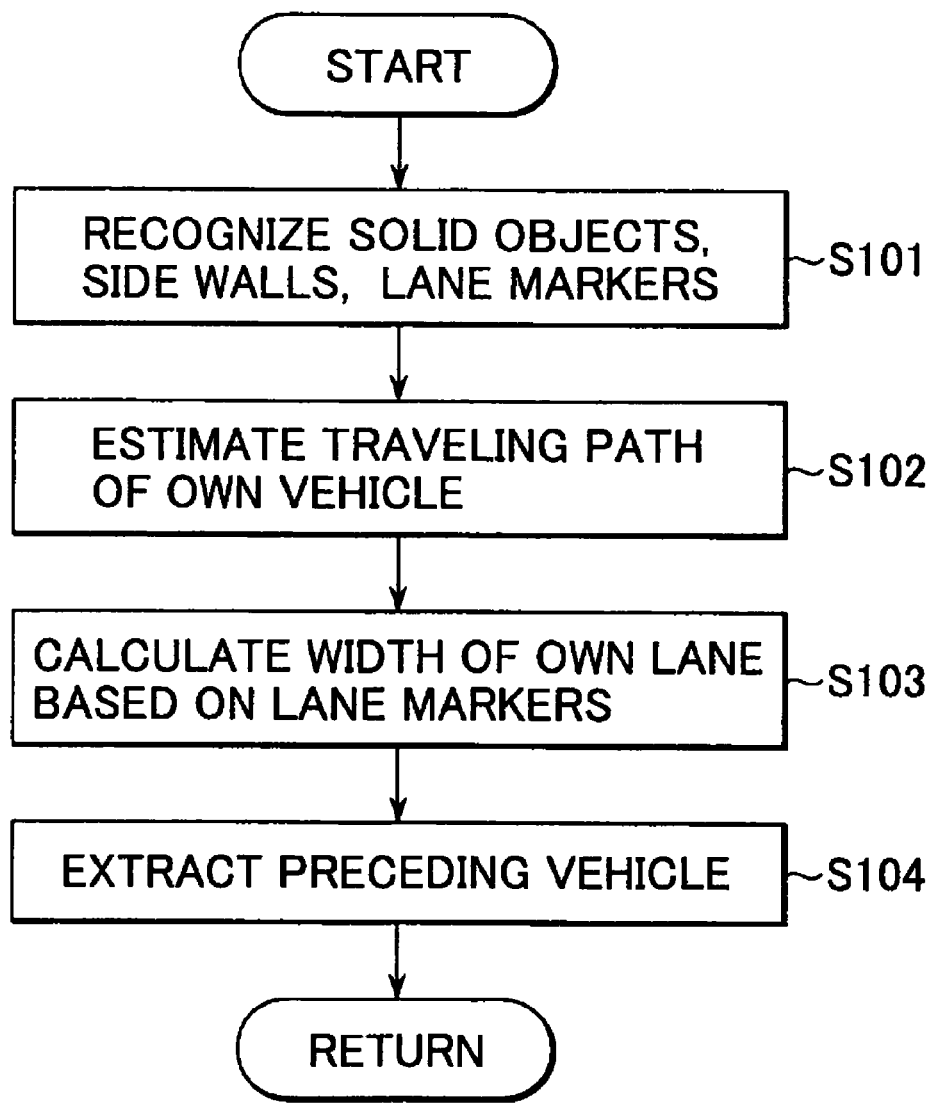
FIG. 2 is a flowchart of a vehicle surroundings monitoring program according to the first embodiment of the present invention.

The routine shown in FIG. 2 is energized every 50 milliseconds. First at a step (hereinafter abbreviated as S) 101, solid object data, side wall data including guardrails, curbs provided along the road and lane marker data are recognized based on images taken by the stereoscopic camera 4. These object data are classified into backward moving objects, still objects and forward moving objects.

Next, the program goes to S102 where the traveling path of the own vehicle is estimated according to the following four methods:

Method A: Estimation of Traveling Path Based on Lane Markers

In case where both or either of left and right lane markers data are obtained and the profile of the lane on which the own vehicle 1 travels can be estimated from these lane markers data, the traveling path of the own vehicle is formed in parallel with the lane markers in consideration of the width of the own vehicle 1 and the position of the own vehicle 1 in the present lane.

Method B: Estimation of Traveling Path Based on Side Wall Data

In case where both or either of left and light side walls data are obtained and the profile of the lane on which the own vehicle 1 travels can be estimated from these side walls data, the traveling path of the own vehicle is formed in parallel with the side walls in consideration of the width of the own vehicle 1 and the position of the own vehicle 1 in the present lane.

Method C: Estimation of Traveling Path Based on a Trace of the Preceding Vehicle The traveling path of the own vehicle 1 is estimated based on the past traveling trace extracted from the solid object data of the preceding vehicle.

Method D: Estimation of Path Based on Trace of the Own Vehicle

The path of the own vehicle 1 is estimated based on the traveling conditions such as yaw rate $\gamma$, vehicle speed V and steering wheel rotation angle $\theta H$ of the own vehicle 1. An example of this method will be described as follows.

First, it is judged whether or not the yaw rate sensor 8 is effective. If it is effective, the present turning curvature Cua is calculated according to the following formula (1).

$$Cua = \gamma / V \quad (1)$$

On the other hand, if the yaw rate sensor 8 is ineffective, it is judged whether or not the vehicle is steered at a steering angle $\delta$ more than a prescribed angle (for example 0.57 radian) obtained from the steering wheel rotation angle $\theta H$. In case where the vehicle is steered at a steering angle more than 0.57 radian, the present turning curvature Cua is calculated according to the following formulas (2), (3) using the steering angle $\delta$ and the vehicle speed V of the own vehicle 1:

$$Re = (1 + A \cdot V^2) \cdot (L/\delta) \quad (2)$$

$$Cua = 1/Re \quad (3)$$

where Re is turning radius; A is stability factor of the vehicle; and L is wheelbase of the vehicle.

Further, if the steering angle $\delta$ is smaller than 0.57 radian, the present turning curvature is set to 0 (in a straightforward traveling condition).

Then, an average turning curvature is calculated from the sum of thus obtained present turning curvature Cua and a turning curvature for a past prescribed time (for example, 0.3 seconds) and the traveling path of the own vehicle is estimated.

Even in case where the yaw rate sensor 8 is effective and the turning curvature Cua is calculated according to the formula (1), if the steering angle $\delta$ is smaller than 0.57 radian, the present turning curvature Cua may be corrected to 0 (straightforward traveling condition).

Figure 3:
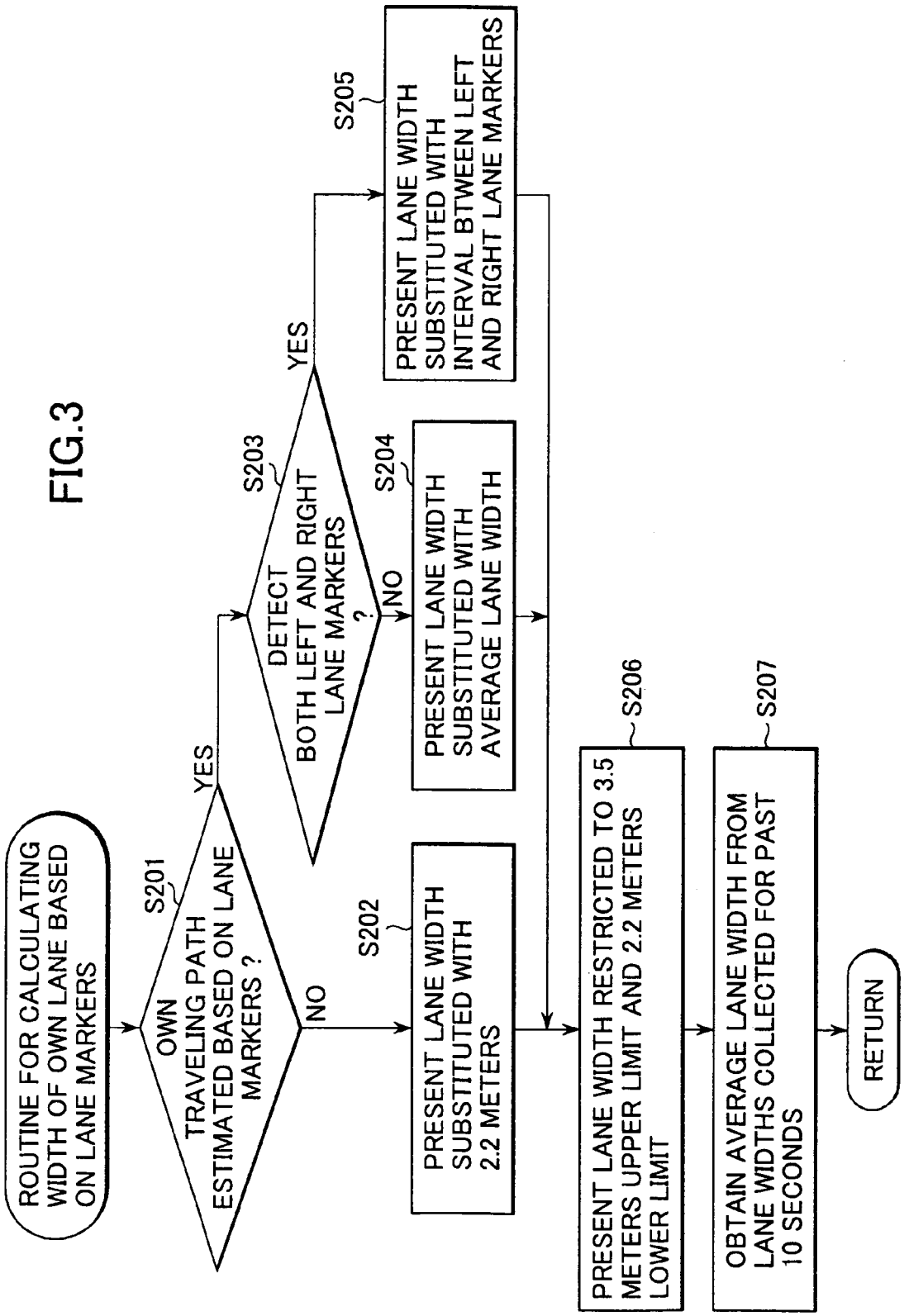
FIG. 3 is a flowchart of a routine for calculating a width of a lane on which an own vehicle travels based on a lane marker according to the first embodiment of the present invention.

Thus, after the traveling path of the own vehicle is estimated, the program goes to S103 where the width of the lane on which the own vehicle travels is calculated based on lane markers according to the flowchart illustrated in FIG. 3. First, at S201, it is judged whether or not the estimation of the own path is based on lane markers, that is, the estimation of the own path is according to the method A at S102.

In this embodiment, the coordinate system of the three-dimensional real space is transferred to a coordinate system fixed to the own vehicle. That is, the coordinate system is composed of X coordinate extending in a widthwise direction of the own vehicle, Y coordinate extending in a vertical direction of the own vehicle, Z coordinate extending in a lengthwise direction of the own vehicle and an origin of the coordinate placed on the road surface underneath the central point of two CCD cameras. The positive sides of X, Y and Z coordinates are established in a right direction, in an upward direction and in a forward direction, respectively. Thus, at S103, since the three-dimensional positions of the respective solid objects and side walls are established in the X, Y, Z coordinates, the position of the traveling path of the own vehicle is determined on the coordinates.

After the processing of S103, the program goes to S104 where the width of the own lane is calculated based on the detected lane markers according to the flowchart shown in FIG. 3. First, at S201, it is judged whether or not the estimation of the own traveling path is based on the lane markers, that is, the estimation of the own traveling path is performed according to the method A.

In case where it is judged at S201 that the estimation of the own traveling path is not based on lane markers, that is, the estimation of the own traveling path is performed according to either of the methods B, C and D, the program goes to S202 where the width of the present lane is substituted with 2.2 (value taking modern road situations into consideration) meters.

On the other hand, in case where it is judged at S201 that the estimation of the own traveling path is based on lane markers, that is, the estimation of the own traveling path is performed according to the method A, the program goes to S203.

At S203, it is judged whether or not both left and right lane markers are detected and if both of the left and right lane markers are not detected (either one is detected), the program goes to S204 where the width of the present lane is substituted with an average width of the lane. If both left and right lane markers are detected, the program goes to S205 where the width of the present lane is substituted with an actual interval between left and right lane markers.

After the present lane width is established at either of S202, S204 and S205, the program goes to S206 where the present lane width is restricted to an ordinarily acceptable value for example between 3.5 for an upper limit and 2.2 meters for a lower limit so as not to be too large or too small. Then, at the next step S207, an average lane width is calculated from the lane widths collected for the past specified time (for example 10 seconds) and the program leaves the routine.

Figure 4:
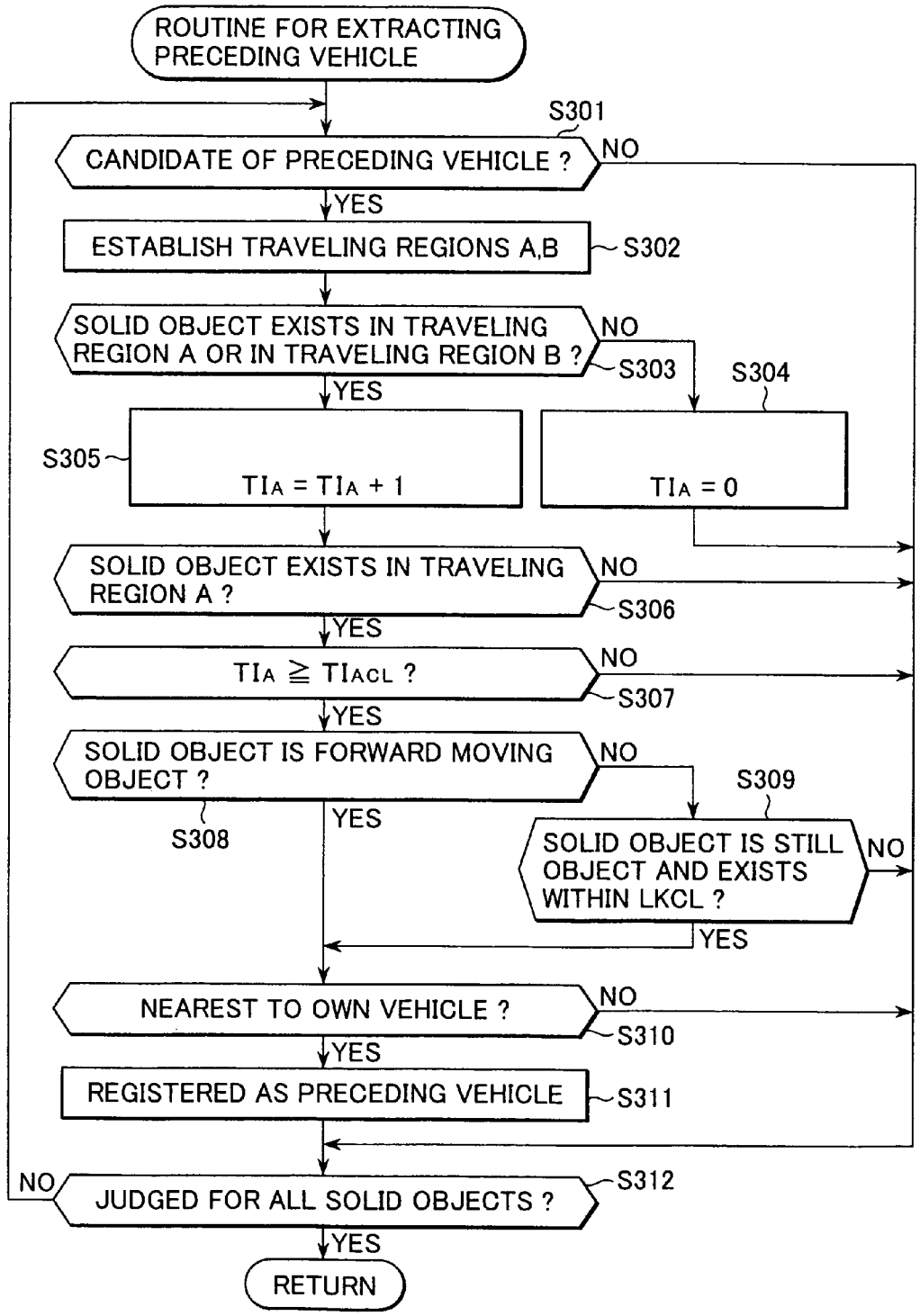
FIG. 4 is a flowchart of a routine for extracting a preceding vehicle according to the first embodiment of the present invention.

Thus, after the lane width of the own vehicle is calculated based on the lane markers at S103, the program goes to S104 in which a preceding vehicle is extracted according to a routine described in FIG. 4.

First, at S301, it is judged whether or not the detected solid object is one of candidates of preceding vehicle. In case where it is judged that the object is not a candidate of preceding vehicle, the program goes to S312 where it is judged whether or not the judgments have been finished for all solid objects. If the judgments have been finished for all solid objects, the program leaves the routine and if the judgments have not been finished, the program returns to S301, from which the judgments start again.

The solid objects judged not to be a candidate of preceding vehicle are judged to be other objects different from preceding vehicles or tentative preceding vehicles.

The candidate for preceding vehicle is a vehicle roughly selected including oncoming vehicles and parked vehicles from solid objects. For example, the candidate for preceding vehicle is selected as follows. If a Z coordinate of a detected solid object is smaller than a threshold value (determined according to a distance to the detected lane marker, a distance to the detected side wall, a size of curve and the like) and in case where the number of continuous detection (determined based on a width of the solid object, a shade of the solid object and the like) of the object exceeds a specified value, that object is regarded as a candidate for preceding vehicle.

Figure 5:
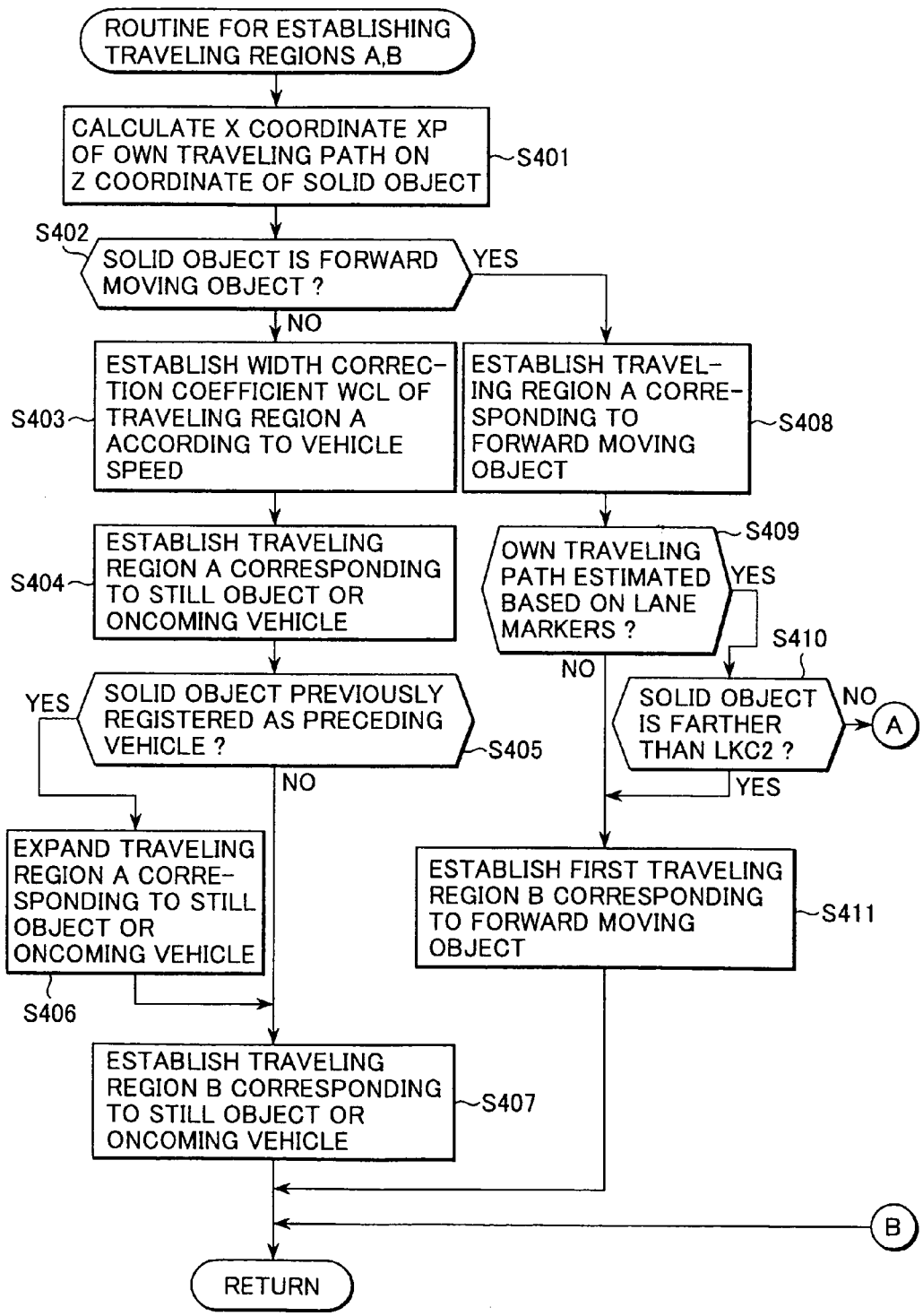
FIG. 5 is a flowchart of a routine for establishing traveling regions A, B according to the first embodiment of the present invention.

When it is judged at S301 that the detected object is a candidate for preceding vehicle, the program goes to S302 where the candidate vehicle is established to either of the traveling regions A and B according to a flowchart illustrated in FIG. 5.

Figure 7:
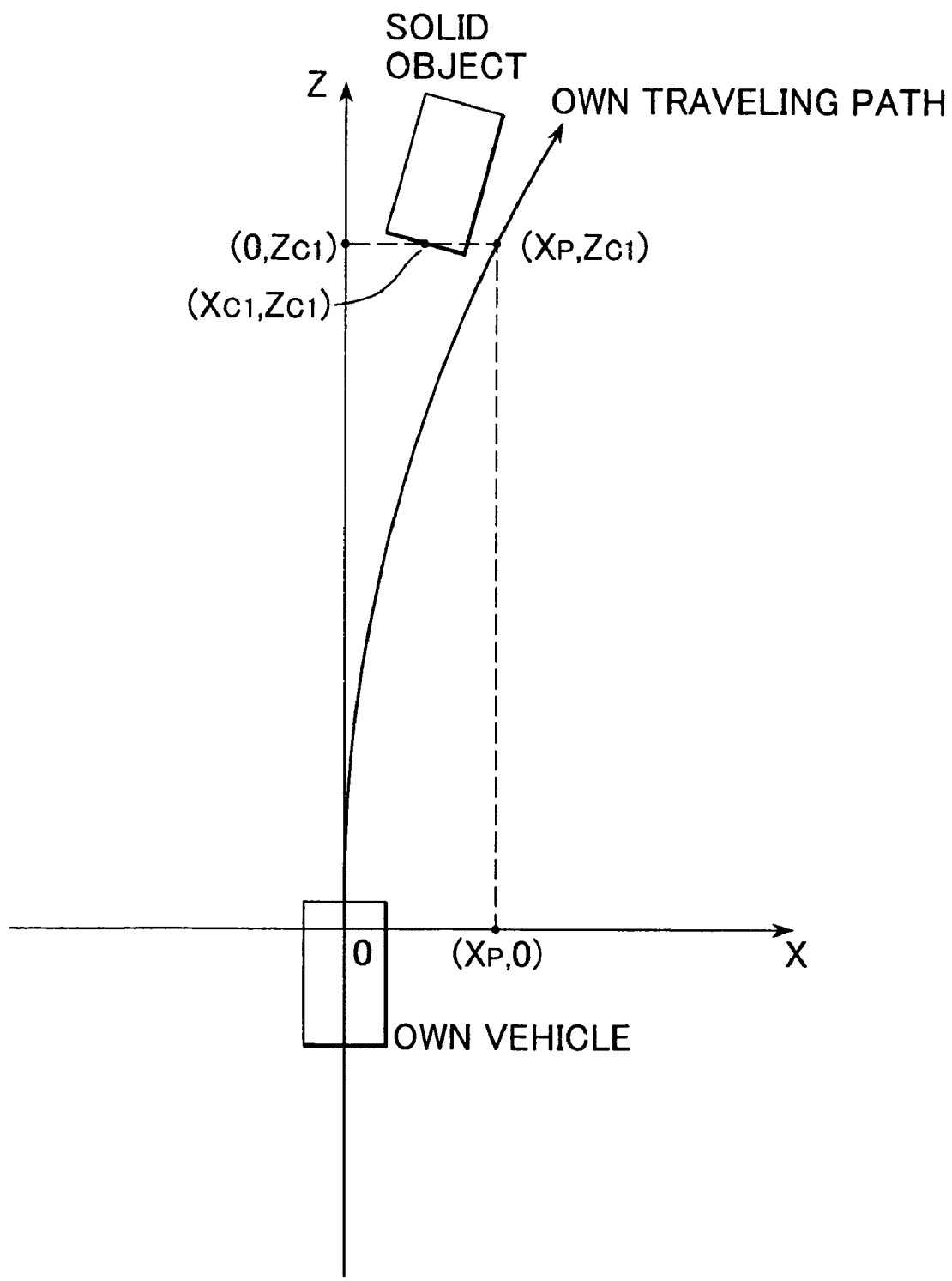
FIG. 7 is an explanatory diagram showing a traveling path of an own vehicle on X-Z coordinates when a solid object exists ahead according to the first embodiment.

First, at S401, X coordinate of the traveling path of the own vehicle on Z axis indicative of the position of the solid object is calculated. Specifically, as shown in FIG. 7, with respect to coordinates (Xcl, Zcl) of the solid object, X coordinate Xp of the traveling path of the own vehicle on Z coordinate Zcl is calculated.

Then, the program goes to S402 where it id judged whether or not the solid object is a forward moving object. In case where the solid object is not a forward moving object, that is, in case where it is judged that the object is an oncoming object or a still object, the program goes to S403 where a correction coefficient Wcl for the width of the traveling region A is established according to the vehicle speed. The correction coefficient Wcl for the width of the traveling region is established to a larger value, as the vehicle speed is large (refer to FIG. 10b).

Then, the program goes to S403 where a traveling region A corresponding to the still object or the oncoming vehicle is established as follows:

In case of Z coordinate of the solid object smaller than 40 meters;

$Xpal=Xp-700-Wcl$ (millimeters)

$Xpar=Xp+700+Wcl$ (millimeters)

In case of Z coordinate of the solid object larger than 40 meters and smaller than 60 meters;

$Xpal=Xp-500-Wcl$ (millimeters)

$Xpar=Xp+500+Wcl$ (millimeters)

In case of Z coordinate of the solid object larger than 60 meters and smaller than 100 meters;

$Xpal=Xp-300-Wcl$ (millimeters)

$Xpar=Xp+300+Wcl$ (millimeters)

In case of Z coordinate of the solid object larger than 100 meters;

$Xpal=Xp-100-Wcl$ (millimeters)

$Xpar=Xp+100+Wcl$ (millimeters)

where Xpal is X coordinate of the left boundary section of the traveling region A and Xpar is X coordinate of the right boundary section of the traveling region A.

As understood from the above formulas, the width of the traveling region A is established to be smaller, as the solid object is located far away.

After that, the program goes to S405 where it is judged whether or not the solid object has been registered as a preceding vehicle previously (in a previous cycle). In case where it is judged that the solid object has been registered as a preceding vehicle, the program goes to S406 where the traveling region A corresponding to the still object or the oncoming vehicle is expanded as follows:

$Xpal=Xpal-300$ (millimeters)

$Xpar=Xpar+300$ (millimeters)

On the other hand, in case where it is judged at S405 that the solid object has not been registered as a preceding vehicle, or in case where the traveling region A is finished to be expanded at S406, the program goes to S407 where a traveling region B corresponding to the still object or the oncoming vehicle is established as follows and leaves the routine.

Xpbl=Xpal

Xpbr=Xpar where Xpbl is X coordinate of the left boundary section of the traveling region B and Xpbr is X coordinate of the right boundary section of the traveling region B.

That is, in case where the solid object is a still object or an oncoming vehicle, the traveling region B is not established because a driver operates the vehicle in a fundamentally different way when the driver takes a countermeasure to deal with the solid object.

On the other hand, in case where it is judged at S402 that the solid object is a forward moving object, the program goes to S408 where a traveling region A corresponding to the forward moving object is established as follows:

$Xpal=Xp-1100$ (millimeters)

$Xpar=Xp+950$ (millimeters)

Then, the program goes to S409 where it is judged whether or not the traveling path of the own vehicle is estimated based on lane markers, that is, the traveling path of the own vehicle is estimated according to the method A at S102. In case where the estimation of the traveling path of the own vehicle is based on lane markers, that is, in case where the estimation of the traveling path of the own vehicle is performed according to the method A at S102, the program goes to S401 where it is judged whether or nor the solid object exists farther than Lkc2.

Figure 10A:
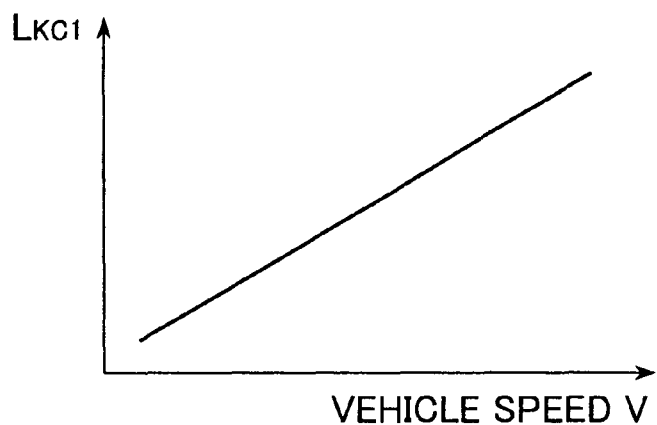
FIG. 10a is a graph showing a relationship a vehicle speed and a threshold value.
Figure 10B:
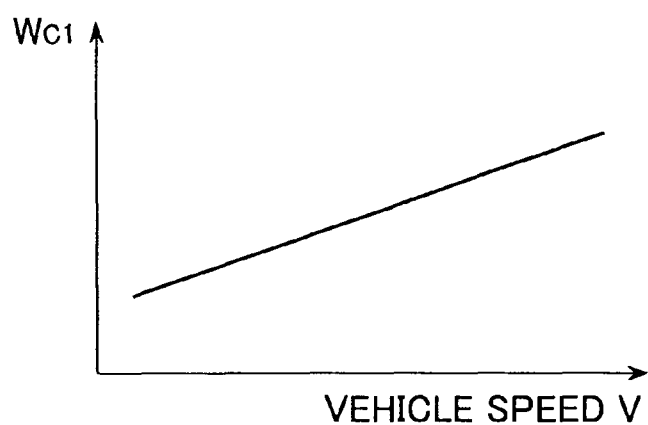
FIG. 10b is a graph showing a relationship a vehicle speed and a threshold value.
Figure 10C:
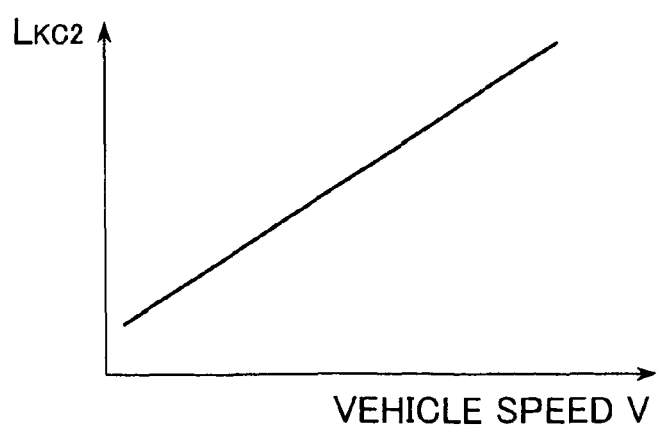
FIG. 10c is a graph showing a relationship a vehicle speed and a threshold value.

As illustrated in FIG. 10c, the Lkc2 is established to a larger (farther) value, as the vehicle speed is high.

At S409, in case where it is judged that the traveling path of the own vehicle is not estimated based on lane markers, that is, in case where the estimation of the traveling path of the own vehicle is performed according to either of the methods B, C and D, or in case where it is judged at S410 that the solid object exists farther than Lkc2, the program goes to S411 where a traveling region B corresponding to the forward moving object is established and leaves the routine. This traveling region B corresponding to the forward moving object is named a first traveling region B to discriminate from others.

Xpbl=Xpal (millimeters)

Xpbr=Xpar (millimeters)

where Xpbl is X coordinate of the left side boundary of the traveling region B and Xpbr is X coordinate of the right side boundary of the traveling region B.

That is, according to the processes at S409 or S410, in case where the traveling path of the own vehicle is not based on lane markers or in case where the solid object exists farther than Lkc2, the traveling region B is not established.

Further, as a result of the judgment at S410, in case where the solid object exists nearer than Lkc2, that is, in case where it is judged at S409 that the traveling path of the own vehicle is estimated based on lane markers and it is judged at S410 that the solid object exists nearer than Lkc2, the program goes to S412 where the position of the left lane marker on Z coordinate of the solid object is calculated.

Figure 8:
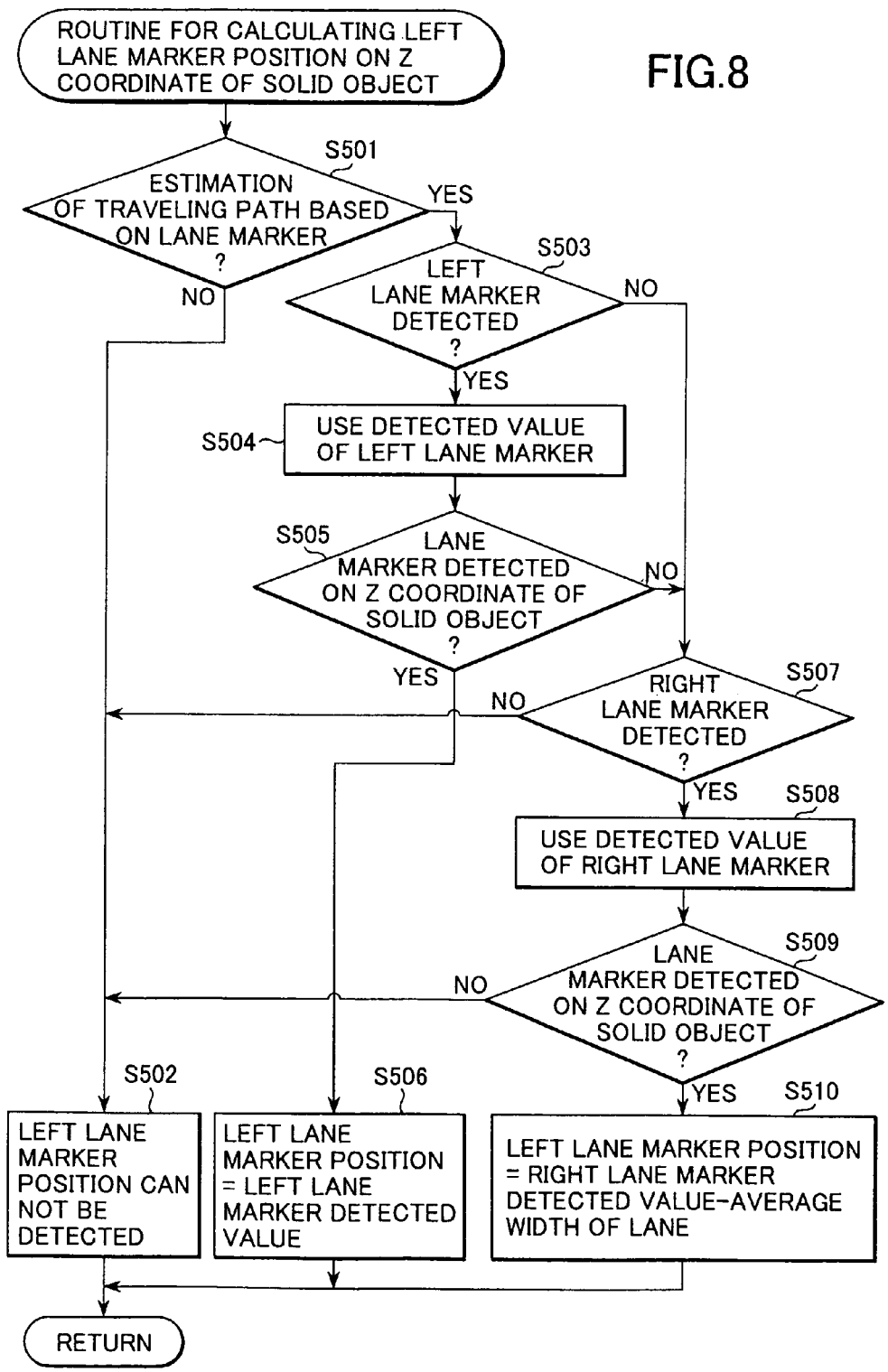
FIG. 8 is a flowchart of a routine for calculating a position of a left lane marker on Z coordinate.

The calculation of the position of the left lane marker is performed according to a flowchart shown in FIG. 8. First, at S501, it is judged whether or not the traveling path of the own vehicle is estimated based on lane markers, that is, it is judged whether or not the traveling path of the own vehicle is estimated according to the method A.

In case where it is judged at S501 that the traveling path of the own vehicle is not estimated based on lane markers, that is, the estimation of the traveling path of the own vehicle is performed according to either of the methods B, C and D, the program goes to S502 where it is judged that the position of the left lane marker can not be detected and then leaves the routine.

On the other hand, in case where it is judged at S501 that the traveling path of the own vehicle is estimated based on lane markers, that is, the estimation of the traveling path of the own vehicle is performed according to the method A, the program goes to S503.

At S503, it is judged whether or not the left lane marker is detected. If the left lane marker is detected, the program goes to S504 where the detected value of the left lane marker is determined to be used for a reference of the position of the left lane marker. Then, at S505, it is judged whether or not a lane marker is detected on Z coordinate of the solid object. If a lane marker is detected, the program goes to S506 where the position of the left lane marker is registered as a detected value of the left lane marker and leaves the routine.

In case where it is judged at S503 that no left lane marker is detected, or in case where it is judged at S505 that no lane marker is detected on Z coordinate of the solid object, the program goes to S507 where it is judged whether or not the right lane marker is detected.

In case where it is judged at S507 that no right lane marker is detected, the program goes to S502 in which it is determined that the left lane marker can not be detected and leaves the routine.

Further, in case where the right lane marker is detected at S507, the program goes to S508 where the detected value of the right lane marker is determined to be used for a reference of the position of the left lane marker and goes to S509.

At S509, it is judged whether or not a lane marker is detected on Z coordinate of the solid object. If detected, the program goes to S510 where the position of the left lane marker is obtained by subtracting the average width of lane (value calculated at S207) from the detected value of the right lane marker and leaves the routine. On the other hand, if not detected, the program goes to S502 where it is determined that the left lane marker can not be detected, leaving the routine.

Thus, after the position of the left lane marker on Z coordinate of the solid object is calculated at S412, the program goes to S413 where the left part of the traveling region B corresponding to the forward moving object is established as follows. Thus established traveling region B is named a second traveling region B to discriminate from others.

Xpbl=Xlinl (millimeters)

where Xpbl is X coordinate of the left boundary section of the traveling region B and Xlinl is X coordinate of the position of the left lane marker calculated at S412.

In case where the position of the left lane marker on Z coordinate of the solid object can not be calculated at S412, Xpbl is established as follows:

$Xpbl=Xpal-200$ (millimeters)

After the left part of the left boundary section of the traveling region B is established at S413, the program goes to S414 where it is judged whether or not the width of the road is large, for example, it is judged whether or not the width of the road is larger than 3400 millimeters. If the width of the road is smaller than 3400 millimeters, the program goes to S415 where the position of the right lane marker on Z coordinate of the solid object is calculated according to the flowchart shown in FIG. 9.

Figure 9:
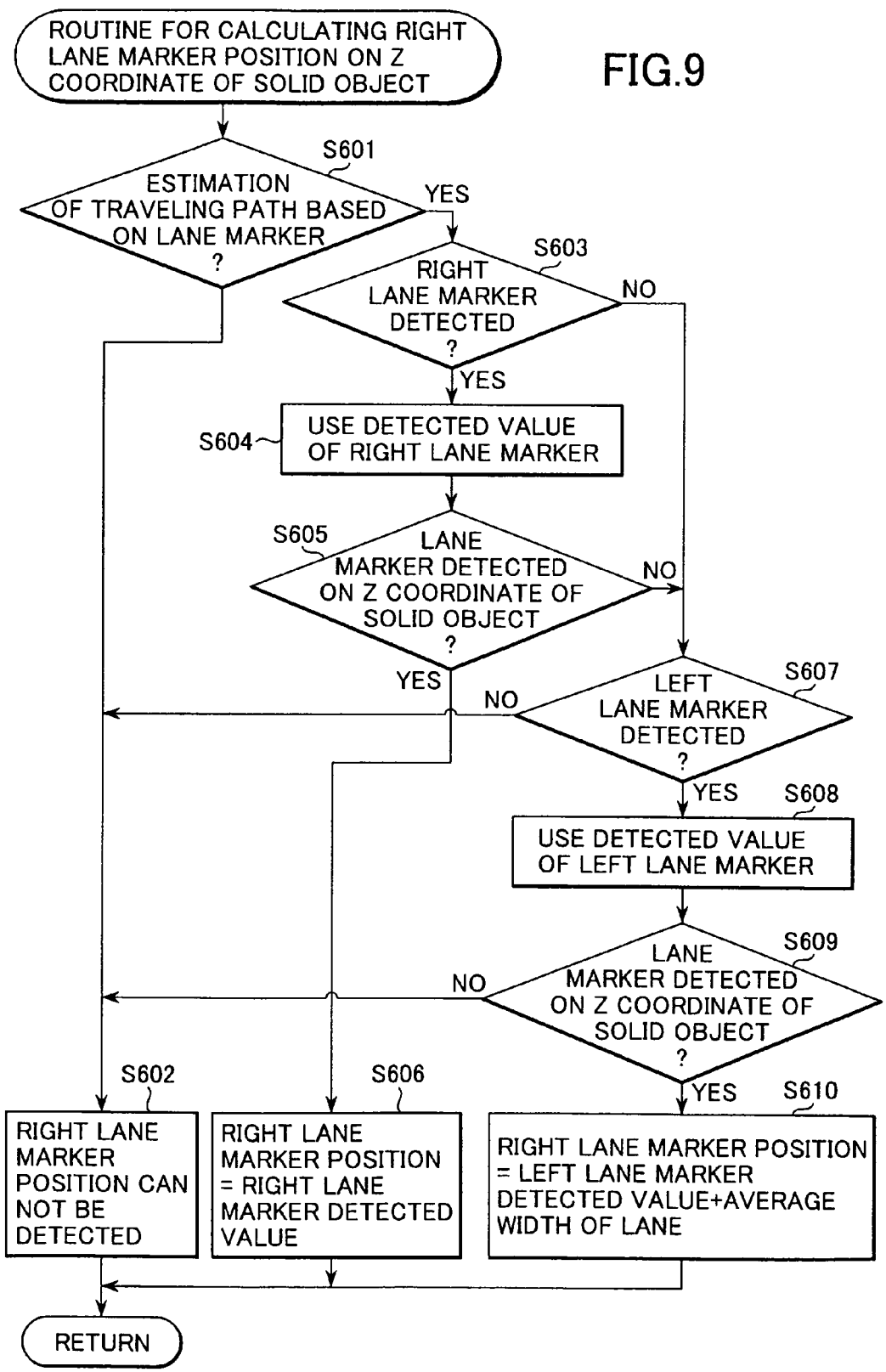
FIG. 9 is a flowchart of a routine for calculating a position of a right lane marker on Z coordinate.

The routine of FIG. 9 is paired with the routine of FIG. 8 and the routine is obtained by replacing "left" in the flowchart of FIG. 8 with "right". First, at S601, it is judged whether or not the traveling path of the own vehicle is estimated based on lane markers, that is, it is judged whether or not the traveling path of the own vehicle is estimated according to the method A.

In case where it is judged at S601 that the traveling path of the own vehicle is not estimated based on lane markers, that is, the estimation of the traveling path of the own vehicle is performed according to either of the methods B, C and D, the program goes to S602 where it is judged that the position of the right lane marker can not be detected and then leaves the routine.

On the other hand, in case where it is judged at S601 that the traveling path of the own vehicle is estimated based on lane markers, that is, the estimation of the traveling path of the own vehicle is performed according to the method A, the program goes to S603.

At S603, it is judged whether or not the right lane marker is detected. If the right lane marker is detected, the program goes to S604 where the detected value of the right lane marker is determined to be used for a reference of the position of the right lane marker. Then, at S605, it is judged whether or not a lane marker is detected on Z coordinate of the solid object. If a lane marker is detected, the program goes to S606 where the position of the right lane marker is registered as a detected value of the left lane marker and leaves the routine.

In case where it is judged at S603 that no right lane marker is detected, or in case where it is judged at S605 that no lane marker is detected on Z coordinate of the solid object, the program goes to S607 where it is judged whether or not the left lane marker is detected.

In case where it is judged at S607 that no right lane marker is detected, the program goes to S602 in which it is determined that the right lane marker can not be detected and leaves the routine.

Further, in case where the left lane marker is detected at S607, the program goes to S608 where the detected value of the left lane marker is determined to be used for a reference of the position of the right lane marker and goes to S609.

At S609, it is judged whether or not a lane marker is detected on Z coordinate of the solid object. If detected, the program goes to S610 where the position of the right lane marker is obtained by adding the average width of lane to the detected value of the left lane marker and leaves the routine. On the other hand, if not detected, the program goes to S602 where it is determined that the right lane marker can not be detected, leaving the routine.

In this embodiment, at the steps S503, S507, S603 or S607, it is merely judged whether or not the left or right lane marker is detected, however the judgment may be ensured by introducing brightness, the degree of continuity and the like of the lane marker.

Thus, after the position of the right lane marker on Z coordinate of the solid object is calculated at S415, the program goes to S416 where the right part of the traveling region B corresponding to the forward moving object is established as follows. Thus established traveling region B is named a second traveling region B to discriminate from others.

$Xpbr=Xlinr$ (millimeters)

where Xpbr is X coordinate of the right boundary section of the traveling region B and Xlinr is X coordinate of the position of the right lane marker calculated at S415.

In case where the right lane marker can not be detected at S415, Xpbr is established as follows:

$Xpbr=Xpar+200$ (millimeters)

where Xpbr is X coordinate of the right boundary section of the traveling region B and Xpar is X coordinate of the right boundary section of the traveling region A.

On the other hand, in case where it is judged at S414 that the width of the road is larger than 3400 millimeters, the program goes to S418 where the traveling region B corresponding to the forward moving object is established as follows. Thus established traveling region B is named a third traveling region B to discriminate from others. That is, in case where the road width is relatively wide, since the road is estimated to have no center lane marker like farm roads, letting the position of the right lane marker on Z coordinate of the solid object be Xlinr=Xpar+200 (millimeters), X coordinate Xpbr of the right boundary section of the traveling region B can be equalized to Xlinr (millimeters).

After the right part of the traveling region B is established at S416 or at S418, the program goes to S417 where it is judged whether or not the solid object has been registered in a previous cycle as a preceding vehicle. If the solid object has not been registered as a preceding vehicle, the program goes to S419 where the left region of the traveling region A corresponding to the forward moving object is expanded as follows.

In case where Xpbl<Xpal−200 and the road width is 3000 to 3500 millimeters, the left region of the traveling region A is expanded to the left boundary coordinate of the traveling region A, Xpal=Xpbl+200, so as to be able to facilitate the judgment as to the registration of the preceding vehicle.

After the left region of the traveling region A is expanded at S419, the program goes to S420 where the right region of the traveling region corresponding to the forward moving object is expanded as follows:

In case where Xpar+200<Xpbr and the road width is 3000 to 3500 millimeters, the right region of the traveling region A is expanded to the right boundary coordinate of the traveling region A, Xpar=Xpbr−200, so as to be able to facilitate the judgment as to preceding vehicles.

After the left and right regions of the traveling region A are expanded at S419 and S420, the program leaves the routine.

On the other hand, in case where it is judged at S417 that the solid object has been registered in a previous cycle as a preceding vehicle, the program goes to S421 where the traveling region B corresponding to the forward moving object is reduced so as to facilitate the judgment as to the canceling of the preceding vehicle as follows:

$Xpbl=Xpbl+200$ (millimeters)

$Xpbr=Xpbr-200$ (millimeters)

where Xpbl is X coordinate of the left boundary section of the traveling region B and Xpbr is X coordinate of the right boundary section of the traveling region B.

Then, the program goes to S422 where the traveling region A corresponding to the forward moving object is established as follows. That is, in case where the following conditions are satisfied, the traveling region A is expanded by equalizing with the traveling region B so as to facilitate the judgment as to the preceding vehicle.

In case of $Xpbl<Xpal-200$, $Xpal=Xpbl$

In case of $Xpar+200<Xpbr$, $Xpar=Xpbr$

Thus, after the traveling region B is reduced at S421 and the traveling region A is reestablished at S422, the program leaves the routine.

Figure 6:
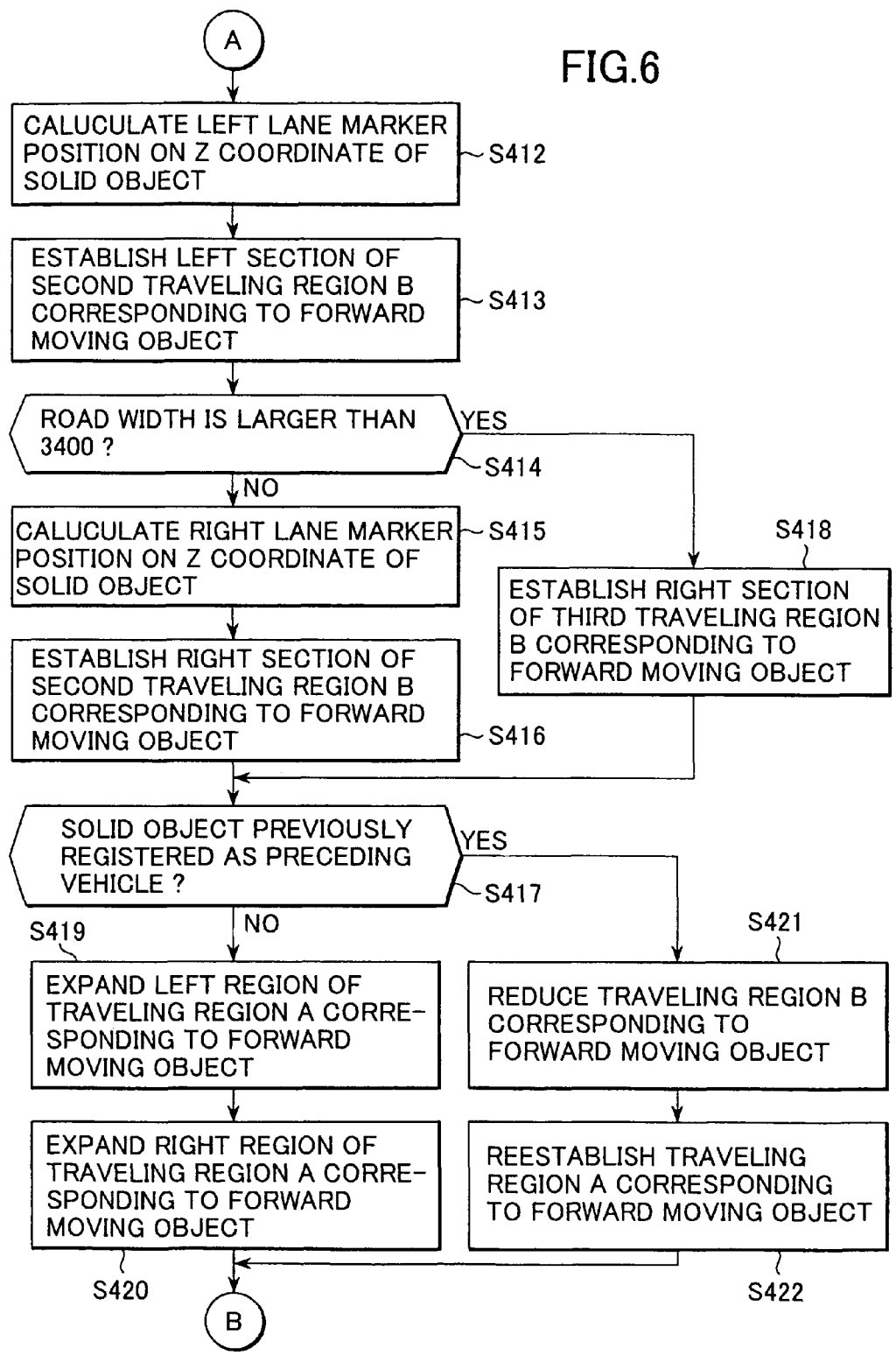
FIG. 6 is a flowchart continued from FIG. 5.

After the traveling regions A, B are established at S302 according to the flowcharts shown in FIGS. 5, 6, the program goes to S303 where it is judged whether or not the solid object exists in the traveling region A or B.

As a result of the judgment at S303, in case where the solid object exists nether in the traveling region A nor in the traveling region B, the program goes to S304 where a count value TIA of a traveling region intrusion timer is cleared (TIA=0) and goes to S312 where it is judged whether or not the judgments are finished for all solid objects. If the judgments are finished for all solid objects, the program leaves the routine and if the judgments are not yet finished, the program returns to S301 from which the same judgments are repeated. That is, in case where it is judged that the solid object exists neither in the traveling region A nor in the traveling B, the solid object is judged to be others different from a preceding vehicle and a tentative preceding vehicle.

On the other hand, in case where it is judged at S303 that the solid object exists in either the traveling region A or the traveling B, the program goes to S305 where the count value TIA of the traveling region intrusion timer is counted up (TIA=TIA+1).

Then, the program goes to S306 where it is judged whether or not the solid object exists in the traveling region A. If the solid object not exists in the traveling region A, the program goes to S312 with the count value TIA unchanged. At S312, it is judged whether or not the judgments have finished for all solid objects. If finished, the program leaves the routine and if not yet finished, the program returns to S301 from which the same judgments are repeated. That, if it is judged that the solid object does not exist in the traveling region A, the solid object is judged to be a tentative preceding vehicle.

In case where it is judged at S306 that the solid object exists in the traveling region A, the program goes to S307 where it is judged that the duration of existence of the solid object in the traveling region A or B exceeds a specified time, namely, the count value TIA of the traveling region intrusion timer exceeds a threshold value TIAcl. As a result of the judgment, if the count value TIA has not yet reached the threshold value TIAcl, the program goes to S312 in which it is judged whether or not the judgments have finished for all solid objects. If the judgments have finished for all solid objects, the program leaves the routine and if not yet finished, the program returns again to S301 from which the judgment is repeated. That is, in case where it is judged at S307 that the count value TIA of the traveling region intrusion timer has not yet reached the threshold value TIAcl, the solid object is judged to be a tentative preceding vehicle.

At S307, in case where the count value TIA is larger than the threshold value TIAcl, the program goes to S308 where it is judged whether or not the solid object is a forward moving object. If it is judged that the solid object is not a forward moving object, that is, it is judged that the solid object is a oncoming vehicle or a still object, the program goes to S309 where it is judged whether or not the solid is a still object and exists within Lkc1 ahead. The Lkc1 is a value established according to the vehicle speed. For example, as shown in FIG. 10a, the Lkc1 is established to a larger value, as the vehicle speed goes high.

Then, as a result of the judgment at S309, the condition that the solid object is a still object and exists within Lkc1 ahead is not satisfied, specifically, in case where the solid object is an oncoming vehicle or the solid object exists farther than Lkc1 ahead, the program goes to S312 where it is judged whether or not the judgments have finished for all solid objects. If the judgments have finished for all solid objects, the program leaves the routine and if the judgments have not yet finished, the program returns again to S301 from which the judgments are repeated. That is, in case where it is judged at S308 that the solid object is a still object and in case where it is judged at S309 that the solid object is not a stationary object existing within Lkc1, the solid object is judged to be a tentative preceding vehicle.

On the other hand, in case where it is judged at S308 that the solid object is a forward moving object, or in case where it is judged at S309 that the solid object is a still object, the program goes to S310 whether or not the solid object is nearest to the own vehicle 1. Then, as a result of the judgment at S310, if the solid object is nearest to the own vehicle 1, the program goes to S311 where the solid object is registered as a preceding vehicle and goes to S312 where it is judged whether or not the judgments have finished for all solid objects. If the judgments have finished for all solid objects, the program leaves the routine and if the judgments have not yet finished for all solid objects, the program returns to S301 from which the same judgments are repeated. On the other hand, as a result of the judgment at S310, in case where it is judged that the solid object is not nearest to the own vehicle, the program goes to S312 where it is judged whether or not the judgments have finished for all solid objects.

If the judgments have finished for all solid objects, the program leaves the routine and if the judgments have not yet finished for all solid objects, the program returns to S301 from which the same judgments are repeated. That is, in case where the solid object is not a nearest one to the own vehicle 1, the solid object is judged to be a tentative preceding vehicle.

According to the first embodiment of the present invention, the traveling path of the own vehicle is estimated based on at least either of vehicle forward information and operating conditions of the own vehicle and the traveling region A is established based on the traveling path. Then, the traveling region B is established based on at least either of the traveling region A and road information. Since the solid object is judged to be either a preceding vehicle or a tentative preceding vehicle according to the state of existence of the solid object in the traveling regions A, B, the preceding vehicle can be detected from among the solid objects existing ahead smoothly and securely with good response. Further, since the traveling control apparatus according to the first embodiment is operated based on accurate vehicle forward information, the traveling control is executed in a natural manner similar to drivers' senses. Further, since the traveling regions A, B are corrected according to the vehicle speed, the preceding vehicle is properly registered according to operating conditions of the own vehicle.

Next, FIG. 11 illustrates a flowchart of a traveling control routine according to a second embodiment of the present invention for extracting a preceding vehicle. The second embodiment is different from the first embodiment in that when the solid object exists in the traveling region A, the traveling region intrusion counter counts up more quickly than when the solid object exists in the traveling region B. Other control strategies are identical to those of the first embodiment and are not described in detail.

The flowchart of the preceding vehicle extracting routine shown in FIG. 4 according to the first embodiment is modified as shown in FIG. 11. In accordance with the flowchart of FIG. 11, after the traveling regions A, B are established at S302, the program goes to S701 where it is judged whether or not the solid object exists in the traveling region A. In case where the solid object exists in the traveling region A, the program goes to S702 where the count value TIAcl is counted up by 2 (TIAcl=TIAcl+2) and goes to S306.

Further, in case where it is judged at S701 that the solid object does not exist in the traveling region A, the program goes to S703 where it is judged whether or not the solid object exists in the traveling region B. As a result of the judgment of S703, if the solid object exists in the traveling region B, the program goes to S704 where the count value TIAcl of the traveling region intrusion timer is counted up by 1 (TIAcl=TIAcl+1) and goes to S306.

On the other hand, as a result of the judgment at S703, in case where the solid object does not exist in the traveling region B, the program goes to S705 where the count value TIA of the traveling region intrusion timer is cleared (TIA=0) and goes to S312. At S312, it is judged whether or not the judgments have finished for all solid objects. If the judgments have finished for all solid objects, the program leaves the routine and if the judgments have not yet finished for all solid objects, the program returns to S301 from which the same judgments are repeated. That is, in case where it is judged that the solid object exists neither in the traveling region A nor in the traveling region B, the solid object is judged to be a thing other than preceding vehicles or tentative preceding vehicles.

Thus, according to the second embodiment of the present invention, since when the solid object exists in the traveling region A, the traveling region intrusion timer counts up faster than when the solid object exists in the traveling region B, the preceding vehicle can be registered in a manner more similar to actual sense of recognition by a driver.

In the first and second embodiments, vehicle forward information is obtained from the stereoscopic camera 4, however it may be obtained from other information acquiring means, such as a combination of monocular camera and laser radar or a combination of monocular camera and infrared radar.

The entire contents of Japanese Patent Application No. Tokugan 2002-259173 filed Sep. 4, 2002, is incorporated herein by reference.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments which can be embodied without departing from the principle of the invention set out in the appended claims.

What is claimed is:

1. A vehicle surroundings monitoring apparatus comprising:
    vehicle traveling condition detecting means for detecting traveling conditions of a vehicle;
    vehicle forward information detecting means for detecting vehicle forward information including at least road configuration and solid objects moving ahead of the vehicle, the road configuration including lane marker data ahead of the vehicle;
    vehicle traveling path estimating means for estimating a traveling path of the vehicle according to at least either of the road configuration and the detected vehicle traveling conditions;
    first judgment region establishing means for establishing a width based on the estimated vehicle traveling path as a first judgment region in the road ahead of the vehicle;
    second judgment region establishing means for establishing a width wider than the first judgment region and based on the lane marker data as a second judgment region in the road ahead of the vehicle; and
    preceding vehicle identifying means for identifying that a solid object ahead of the vehicle is a preceding vehicle when the solid object currently exists within the first judgment region and the solid object has existed in either the first judgment region or the second judgment region for more than a threshold time period.

2. A traveling control system for controlling travel of a vehicle, wherein the vehicle is provided with the vehicle surroundings monitoring apparatus according to claim 1, and the travel of the vehicle is controlled to follow the preceding vehicle such that the intervehicle distance between the vehicle and the preceding vehicle is kept generally constant.

3. The vehicle surroundings monitoring apparatus according to claim 1, wherein the preceding vehicle identifying means identifies the preceding vehicle when the solid object is within a specified distance from the vehicle, and
    wherein the specified distance is larger when the speed of the vehicle is higher.

4. The vehicle surroundings monitoring apparatus according to claim 1, wherein the first judgment region and the second judgment region are established when it is judged that the solid object is a forward moving object moving in the same direction as the vehicle.

* * * * *